United States Patent Office 3,345,399
Patented Oct. 3, 1967

3,345,399
CARBAMATE ESTERS OF ADAMANTANE, MONO-
AND DI-METHYLADAMANTANE AND HOMO-
ADAMANTANE
Koert Gerzon and Eriks Krumkalns, Indianapolis, Ind.,
assignors to Eli Lilly and Company, Indianapolis, Ind.,
a corporation of Indiana
No Drawing. Filed Jan. 21, 1965, Ser. No. 427,124
1 Claim. (Cl. 260—468)

This invention relates to a group of novel adamantyl-oxycarbonyl derivatives of α-amino acids and to certain intermediates useful in the synthesis of these derivatives.

The compounds provided by this invention can be represented by the following formulas:

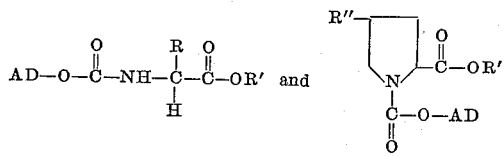

wherein AD is a member of the group consisting of adamantyl, methyladamantyl, dimethyladamantyl and homoadamantyl; R is a member of the group consisting of hydrogen, $C_1$–$C_4$ alkyl, hydroxy-substituted $C_1$–$C_4$ alkyl, carboxy lower alkyl-substituted $C_1$–$C_4$ alkyl, mercapto-substituted $C_1$–$C_4$ alkyl, lower alkyl-mercapto-substituted $C_1$–$C_4$ alkyl, guanidino-substituted $C_1$–$C_4$ alkyl, benzyl, substituted benzyl, imidazolylmethyl, indolymethyl, hydroxyindolylmethyl, phenyl, substituted phenyl, thienyl, and furyl; R' is a member of the group consisting of hydrogen and $C_1$–$C_4$ alkyl; and R" is a member of the group consisting of hydrogen and hydroxyl. Also included within the scope of this invention are alkali metal and amine salts of acids represented by the above formulas.

Adamantane and homo-adamantane, from which are derived the adamantyl, methyladamantyl, dimethyladamantyl and homoadamantyl radicals referred to above, are tricyclic multi-bridged hydrocarbons. Their structures are conventionally represented in two dimensions by the following formulas:

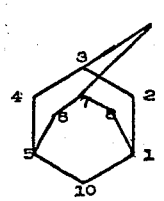
adamantane

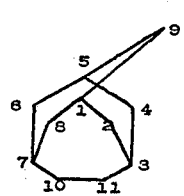
homo-adamantane

As can be seen from the above formulas, in adamantane, all odd- and all even-numbered positions are equivalent. Homoadamantane has two pairs of equivalent bridgehead carbon atoms, $C_1$ and $C_5$ and $C_3$ and $C_7$.

In the above formula, where R or R' is $C_1$–$C_4$ alkyl, it can be, illustratively isobutyl, sec.-butyl, isopropyl, n-propyl, methyl, ethyl, n-butyl and t-butyl. When R is a substituted $C_1$–$C_4$ alkyl group said substituents being mercapto, lower alkyl mercapto, carboxy lower alkyl, guanidino, and hydroxy, illustrative radicals which R can represent include hydroxymethyl, mercaptomethyl, methylmercaptomethyl, methylmercaptoethyl, ethylmercapto- methyl, γ-guanidinobutyl, β-hydroxyethyl, β-hydroxy-t-butyl, β-isopropylmercaptoethyl, γ-hydroxypropyl, γ-mercapto-n-butyl, carboxymethyl, β-carboxyethyl, and the like. The term "lower alkyl" as used herein means an alkyl group having from 1 to 3 carbon atoms, and includes methyl, ethyl, n-propyl and isopropyl. When R represents a substituted-benzyl group or substituted-phenyl group, the substituents in the phenyl ring can be halo such as fluoro, chloro, bromo, iodo and the like; lower alkyl, lower alkoxy, hydroxy, and halo-substituted lower alkyl. Thus groups which illustrate R when it is a substituted-benzyl or substituted-phenyl radical include 3,5-di-iodo-4-hydroxybenzyl, 3,4-dihydroxybenzyl, 4-hydroxybenzyl, 4-trifluoromethylbenzyl, 4-trichloromethyl-benzyl, 4-pentafluoroethylbenzyl, 4-α-bromopropylbenzyl, veratryl, isovanillyl, vanillyl, 4-isopropoxybenzyl, 2,4-dimethylbenzyl, 3-isopropylbenzyl, 4-chlorophenyl 2,6-dibromophenyl, m-tolyl, 3,4-xylyl, p-anisyl p-propoxylphenyl, m-ethoxyphenyl, 4-iodophenyl, 3,5-di-iodo-4-hydroxyphenyl p-trifluoromethylphenyl, and the like. Other substituents, in addition to those enumerated above, can be present in the phenyl group or in the phenyl portion of the benzyl group without any qualitative change in the properties of the parent compound, as will be apparent to those skilled in the art. When R is a hydroxy-substituted indolyl-methyl radical, the hydroxy group is in the benzo portion of the indolyl radical. R can then also be, illustratively, 5-hydroxyindolylmethyl, 6-hydroxyindolylmethyl, and the like.

Illustrative compounds coming within the scope of this invention include the following:

N-1-adamantyloxycarbonyl L-tyrosine
N-3-methyladamantyloxycarbonyl L-phenylalanine
N,N'-bis-(1-adamantyloxycarbonyl) L-cystine
N-3,5-dimethyladamantyloxycarbonyl D-valine
Ethyl N-3-homo-adamantyloxycarbonyl 2,4-dichloro-
  phenylalaninate
N-1-adamantyloxycarbonyl 2,6-dimethoxyphenylglycine
N-1-adamantyloxycarbonyl L-proline As can readily be seen, compounds represented by the above formulas include the N-adamantyloxycarbonyl derivatives of all the naturally occurring α-amino acids, as well as lower homologues and isosteres thereof. These compounds are all useful in the synthesis of peptides, both natural and unnatural, inasmuch as the adamantyloxycarbonyl group can act as a blocking group by preventing both the reaction of the blocked amino group with an acylating agent and the formation of a zwitterion. When employed as a blocking group in peptide synthesis, the adamantyloxycarbonyl group has the advantage of yielding more stable derivatives than are obtained with conventional blocking groups, yet which are at the same time readily hydrolizable under conditions ordinarily used to remove the conventional blocking groups. In addition, the N-adamantyloxycarbonyl derivatives of amino acids, as represented by the above formulas, can be used in the synthesis of penicillins and cephalosporins. In such reactions, the adamantyloxycarbonyl group again functions as a blocking group, preventing not only reaction of the amino function with cephalosporanic acid or penicillanic acid or with itself, but also formation of an unreactive zwitterion. The ease of splitting the adamantyloxycarbonyl group from the resulting penicillin or cephalosporin prevents any undue destruction of the penicillin or cephalosporin necessitated by the use of more acidic hydrolytic reagents.

In addition to their ease of hydrolysis, the adamantyloxycarbonyl derivatives of amino acids are more easily isolated than the corresponding compounds using more conventional blocking groups. Furthermore, the adamantylcarbamates themselves are frequently crystalline, in contrast to derivatives of amino acids with the more conventional blocking agents.

The adamantyloxycarbonyl blocking group can be readily cleaved from the adamantylcarbamate by treatment with trifluoroacetic acid or with anhydrous hydrogen chloride in an inert solvent such as dioxane. Other methods of cleaving these carbamates will readily suggest themselves to those skilled in the art.

Compounds represented by the above formulas are prepared according to the following reaction sequence:

REACTION SEQUENCE I

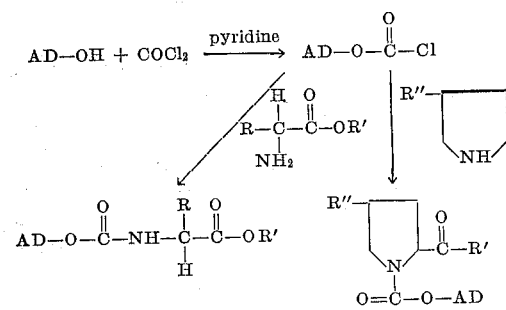

wherein AD, R, R' and R" have the same meaning as hereinabove. In carrying out the above reaction sequence, 1-hydroxyadamantane or 3-methyl-1-hydroxyadamantane or 3,5-dimethyl-1-hydroxyadamantane or 3-hydroxyhomo-adamantane is reacted with phosgene in the presence of a tertiary amine such as pyridine, trimethylpyridine, quinoline, or tri-ethylamine in an inert solvent, such as anhydrous benzene or ether or other hydrocarbon or ethereal solvents, to form the corresponding adamantyl chloroformate. It was completely unexpected that the chloroformates of adamantane and its congeners would be stable inasmuch as t-butylchloroformate, the open-chain analog of these compounds, is completely unstable and cannot be isolated, according to Choppin and Rogers, J. Am. Chem. Soc., 70, 2967 (1948). The instability of t-butylchloroformate was to be expected from its presumed readiness to form the transient t-butylcarbonium ion which disappears rapidly in solution to yield either the corresponding alcohol or chloride or to yield isobutene, depending upon the physical and chemical environment. No theoretical reason is known why the adamantyl chloroformates do not also spontaneously decompose to yield the corresponding carbonium ions and then disappear as the hydroxy compound or the chloride or as tar (inasmuch as an unsaturated compound corresponding to isobutene cannot be formed from the 1-adamantylcarbonium ion). Not only are these adamantyl chloroformates sufficiently stable to enable the compound to be used in further reactions such as the formation of adamantyloxycarbonyl derivatives, but also, in the case of 1-adamantyl chloroformate itself, for example, the compound can be isolated as a white crystalline solid with a melting point well above ordinary room temperature.

Inasmuch as the adamantyl chloroformates are reasonably stable at 0° C., the second step of the reaction, the formation of the N-adamantyloxycarbonyl derivative of the amino acid, takes place readily and in good yield by simply mixing the two reactants in an inert solvent, under slightly alkaline conditions. In order to have such alkaline conditions, we prefer to employ the sodium salt of the amino acid as the starting material and to add dilute sodium hydroxide or its equivalent as required in dropwise fashion during the course of the reaction. Useful inert solvents include ethers, such as dioxane or ether, alcohols, such as t-butanol or ethanol, and mixtures of these solvents with water.

An alternative and somewhat more complex route starting with adamantyl chloroformate is available for the preparation of the compounds of this invention and is outlined in Reaction Sequence II below.

REACTION SEQUENCE II

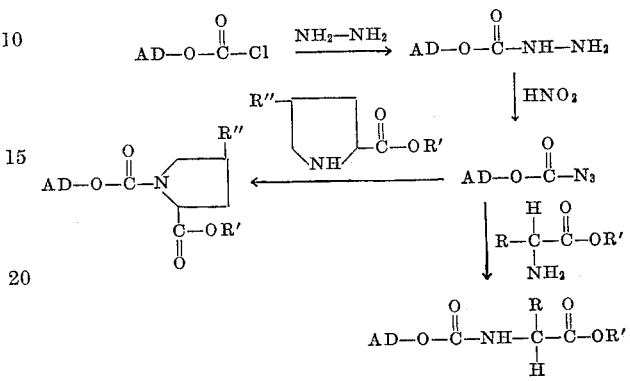

wherein AD, R, R' and R" have the same meaning as hereinabove. According to the above reaction sequence, an N-adamantyl chloroformate is reacted with hydrazine to yield the corresponding 1-adamantyl or 3-methyl-1-adamantyl or 3,5-dimethyl-1-adamantyl or 3-homo-adamantyl carbazate. Reaction of the carbazate with nitrous acid yields the corresponding azidoformate, which compound reacts with the α-amino acid to yield an N-adamantyloxycarbonyl derivative of the amino acid in good yield. The adamantyl carbazates,

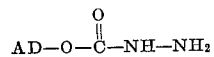

can also be prepared by reacting an adamantyl-p-nitrophenyl carbonate with anhydrous hydrazine or by reacting an O-1-adamantyl-S-methyl thiolcarbonate with anhydrous hydrazine.

Although, as indicated above, an adamantyl azidoformate can react with an amino acid to yield the same derivative as would be obtained by reaction of the amino acid with an adamantyl chloroformate, there is a condsiderable advantage to using the chloroformate in place of the azidoformate. The latter type of compound is potentially explosive, and it is a considerable advantage of this invention that, in the adamantyl series, it is possible to use the virtually non-explosive, yet more reactive, chloroformate as a blocking group in peptide synthesis.

As is apparent from Reaction Sequences I and II, the adamantyl chloroformates are useful as intermediates in various reactions. It is also apparent from Reaction Sequence II that the carbazates and azidoformates of adamantane, 3-methyladamantane, 3,5-dimethyladamantane an homo-adamantane, are also useful as intermediates in the synthesis of the compounds of this invention.

This invention is further illustrated by the following specific examples:

EXAMPLE I

*1-hydroxyadamantane from 1-bromoadamantane*

A reaction mixture containing 21 g. of 1-bromoadamantane, 50 ml. of 85% hydrazine hydrate, and 150 ml. of ethanol was heated to refluxing temperature for about 10 hours. Removal of the volatile constituents by evaporation in vacuo yielded a solid residue comprising 1-hydroxyadamantane. The residue was treated with 100 ml. of cold water and the 1-hydroxyadamantane taken up in 500 ml. of ether. The ether extract was separated and dried, and the ether removed by evaporation in vacuo. The resulting residue weighing 12.6 g. and melting at 220° C., was found to be identical in all respects to 1-hydroxyadamantane as prepared by Stetter, Ber., 92, 1679 (1959).

EXAMPLE II

1-adamantyl chloroformate

A solution containing 20 g. of phosgene in 100 ml. of anhydrous benzene was maintained at about 20° C. by means of an ice-water bath. A mixture containing 8 g. of 1-hydroxyadamantane, 6 g. of pyridine, and 200 ml. of ether was added dropwise with stirring to the phosgene solution over a period of about 1 hour while still maintaining the solution temperature at about 20° C. During the addition, a white solid precipitate was formed, and an additional 100 ml. of anhydrous benzene were added to give a better dispersion of the solids in the reaction mixture. After the addition had been completed, the reaction was maintained at ambient temperature for about 1 hour and was then filtered. The filtrate was poured over a mixture of ice and water, and this mixture was then placed in a separatory funnel and shaken. The organic layer was separated and dried, and its volume reduced by about 80% by evaporation in vacuo. An aliquot of the resulting solution was evaporated in vacuo to dryness at room temperature, yielding 1-adamantyl chloroformate as a white crystalline solid melting at about 40–42° C. Recrystallization was achieved from anhydrous petroleum-ether (boiling point=30–60° C.) at −20° C., yielding crystals melting at about 46–47° C. Infrared spectrum of the product confirmed the expected structure.

*Analysis.*—Calc.: C, 61.54; H, 7.04; Cl, 16.52. Found: C, 61.48; H, 7.06; Cl, 16.93.

Adamantyl chloroformate can be stored essentially without decompositinon at 4° C. in benzene-ether solution by addition of a small amount of calcium carbonate as a stabilizer.

EXAMPLE III

3,5-dimethyl-1-adamantyl chloroformate

Following the procedure of Example II, 3,5-dimethyl-1-hydroxyadamantane was reacted with phosgene in benzene solution in the presence of pyridine. The compound was isolated and purified by the procedures of the same example and had the typical infrared absorption spectrum characteristic of oxycarbonyl chlorides; M.P.=about 5–10° C.

EXAMPLE IV

3-homo-adamantyl chloroformate 3-homo-adamantyl chloroformate was prepared by the procedure of Example II from phosgene and 3-hydroxy-homo-adamantane. This latter compound was prepared by the procedure of Stetter and Goebel, Ber., 96, 550 (1963). The compound was isolated in crystalline form from petroleum-ether at −50° C., but its melting point was below 0° C. The liquid had the typical infrared absorption spectrum characteristic of oxycarbonyl chlorides.

EXAMPLE V

1-adamantyl carbamate 1-admantyl chloroformate was further characterized by its conversion to the corresponding carbamate as follows:

A solution of 75 mg. of 1-adamantyl chloroformate in 25 ml. of anhydrous benzene was saturated with gaseous ammonia for about 1 hour. The reaction flask was then stoppered, and the resulting solution maintained at ambient temperature for 24 hours. The reaction mixture was then filtered, and the filtrate shaken with 200 ml. of an ice-water mixture. Two hundred milliliters of ether were added, and the ether-benzene layer was separated and dried. Evaporation of the resulting solution in vacuo yielded 1-adamantyl carbamate, which melted at about 170–171° C. after recrystallization from boiling anhydrous ethanol.

*Analysis.*—Calc.: N, 7.25. Found: N, 6.83.

1-adamantyl carbamate prepared as above was found to be identical to 1-adamantyl carbamate prepared by the interaction at elevated temperature of ammonia and adamantyl phenylcarbonate, prepared by the general method for preparation of phenylcarbamates given by McLamore, J. Org. Chem., 20, 1379 (1955).

1-adamantyl N-methyl carbamate was prepared by the above procedure by substituting methylamine for ammonia. 1-adamantyl N-methyl carbamate thus prepared melted at about 127–129° C. on recrystallization from an ether-hexane solvent mixture.

*Analysis.*—Calc.: C, 68.86; H, 9.15; N, 6.69. Found: C, 68.51; H, 9.04; N, 6.77.

EXAMPLE VI

1-adamantyl N-adamantyl carbamate 1-adamantyl chloroformate was also characterized by conversion to the N-adamantyl carbamate by reaction with adamantylamine as follows:

A solution containing 0.3 g. of 1-adamantyl chloroformate dissolved in 12.5 ml. of anhydrous ether was added to a stirred solution containing 1 g. of adamantylamine in 25 ml. of anhydrous ether in dropwise fashion at room temperature. After the addition had been completed, stirring was continued for an extra half hour. Adamantylamine hydrochloride, a by-product of the reaction forming 1-admanantyl N-adamantyl carbamate, was removed by filtration. The filtrate was washed twice with 5-ml. portions of 1 N aqueous hydrochloric acid and twice with water to remove the excess adamantylamine. The filtrate was then dried and concentrated by heating at atmospheric pressure. Pentane was then added to the heated solution to the point of incipient precipitation, and the solution was cooled, yielding 1-adamantyl N-adamantyl carbamate, melting at about 305–310° C.

*Analysis.*—Calc.: C, 76.55; H, 9.48; N, 4.25. Found: C, 76.65; H, 9.68; N, 4.09.

The adamantyl carbamates are useful as insecticides.

EXAMPLE VII

1-adamantyl azidoformate

Forty milligrams of sodium nitrite crystals were added to a mixture of 100 mg. of 1-adamantyl carbazate, 1 ml. of 2-aqueous hydrochloric acid and 2 ml. of acetone. The mixture was shaken until the crystals had dissolved. Two milliliters of water were added. A water-insoluble yellow oil was obtained and was extracted with three 25-ml. portions of hexane. The hexane extracts were combined and washed with 10% hydrochloric acid, 10% sodium bicarbonate solution, and water. The hexane solution was then separated and dried. Evaporation of the hexane in vacuo yielded a pale yellow oily liquid which had the typical infrared absorption spectrum of an acid azide.

If desired, the azidoformate can also be prepared utilizing other standard reagents, as for example, by the reaction of adamantyl chloroformate and sodium azide.

EXAMPLE VIII

1-adamantyl carbazate

A solution containing 2 g. of 1-adamantyl chloroformate in 150 ml. of benzene was added slowly to a well-stirred solution of 2.5 g. of anhydrous hydrazine in 20 ml. of t-butyl alcohol. After the reaction mixture had been stirred for about two hours, the solvents were removed in vacuo. The sirupy residue was dissoved in a mixture of 150 ml. of ether and 10 ml. of water. The ether layer was separated, washed with 35-ml. portions of water, with 5 ml. of 1% sodium carbonate solution, and again with 5 ml. of water. The ethereal solution was dried. Ten milliliters of anhydrous hexane were added and the solution concentrated to a volume of about 10 ml. Cooling the solution at about −10° C. yielded shiny, white crystalline plates of 1-adamantyl carbazate melting at about 141–142° C.

*Analysis.*—Calc.: N, 13.32. Found: N, 12.99.

1-adamantyl carbazate can also be prepared by the ineraction of 1-adamantyl p-nitrophenylcarbonate and hydrazine. 1-adamantyl p-nitrophenyl carbonate itself is prepared from 1-hydroxy-adamantane by the method of Anderson and McGregor, J. Am. Chem. Soc., 79, 6181 (1964). The carbonate melts at about 106–108° C. on recrystallization from a hexane-ether solvent mixture.

*Analysis.*—Calc.: C, 64.34; H, 6.04; 4.41. Found: C, 64.16; H, 5.81; N, 4.60.

1-adamantyl carbazate can also be prepared by heating O-1-adamantyl S-methyl thiolcarbonate with hydrazine. O-1-adamantyl S-methyl thiolcarbonate itself is prepared from 1-hydroxy-adamantane and methyl chlorothioformate according to the general procedure described by Carpino, J. Org. Chem., 28, 1910 (1963).

3,5-dimethyl-1-adamantyl carbazate was prepared from 3,5-dimethyl-1-adamantyl chloroformate and hydrazine according to the above procedure. In addition, 1-homo-adamantyl carbazate was prepared from 1-homo-adamantyl chloroformate and hydrazine. Both of the above compounds gave the typical infrared carbazate spectrum, having the strong absorption at 5.9μ and 6.1μ characteristic of oxycarbonyl hydrazides.

Following the above procedure, 3-homo-adamantyl chloroformate was reacted with anhydrous hydrazine to yield the corresponding carbazate which melted at about 67° C.

*Analysis.*—Calc.: N, 12.41. Found: N, 11.97.

Following the above procedure, 3,5-dimethyl-1-adamantyl chloroformate was reacted with anhydrous hydrazine to yield the corresponding carbazate; M.P. =74–75° C.

*Analysis.*—Calc.: N, 11.76. Found: N, 11.37.

3-methyl-1-adamantyl chloroformate and carbazate are prepared by substituting 3-methyl-1-adamantyl alcohol for the corresponding 3,5-dimethyl compound employed in the above procedure.

EXAMPLE IX

N-1-admantyloxycarbonyl-D-phenylglycine

A solution of sodium D-phenylglycine was prepared by suspending 151 mg. of D-phenylglycine in a mixture of 2 ml. of water and 1.2 ml. of 1 N aqueous sodium hydroxide at 0° C. A second solution containing 225 mg. of 1-admantyl chloroformate in a mixture of 2.5 ml. of dioxane and 1 ml. of ether was added in 5 portions to the sodium D-phenylglycinate solution over a period of about 40 minutes. During the addition of the acid chloride solution, an additional 1 ml. of 1 N aqueous sodium hydroxide was added dropwise in order to maintain a slightly alkaline pH in the reaction mixture. The reaction mixture was next extracted with three volumes of ether to remove any unreacted adamantyl chloroformate. The alkaline aqueous layer was cooled to about 0° C. and cautiously acidified with 85% phosphoric acid until a pH of approximately 4.5 was attained. A milky precipitate of of N-1-adamantyloxycarbonyl-D-phenylglycine formed and was extracted with ether. The ether solution was separated and dried. Evaporation of the ether in vacuo yielded an oily residue, trituration of which with a few drops of cyclohexane followed by refrigeration at about 0° C. yielded N-1-adamantyloxycarbonyl-D-phenylglycine as a white crystalline solid weighing 228 mg. and melting at about 119–121° C.

*Analysis.*—Calc.: C, 69.28; H, 7.04; N, 4.25. Found: C, 69.22; H, 7.17; N, 4.18.

The above compound can also be prepared by the interaction of 1-adamantyl azidoformate and phenylglycine in the presence of tri-ethylamine Furthermore, the same derivative can be prepared by reaction of the amino acid was 1-adamantyl p-nitrophenyl carbonate or with O-1-adamantyl S-methyl thiolcarbonate.

EXAMPLE X

N-1-adamantyloxycarbonyl glycine

Following the procedure of Example IX, 1-adamantyl chloroformate was reacted with sodium glycinate to yield N-1-adamantyl-oxycarbonyl glycine melting at about 141–142.5° C. after recrystallization from hexane.

*Analysis.*—Calc.: N, 5.53. Found: N, 5.81.

In addition to the amino acids utilized in Example IX and X, the following amino acids will also yield adamantyloxycarbonyl derivatives: leucine, isoleucine, tyrosine, valine, serine, alanine, phenylalanine, DOPA, norleucine, histidine, di-iado tyrosine, arginine, cysteine, methianine ethionine, proline, hydroxyproline, aspartic acid and glutamic acid.

We claim:

An adamantyl carbamate of the formula

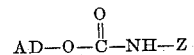

wherein AD is a member of the group consisting of adamantyl, methyladamantyl, dimethyladamantyl and homo-adamantyl, and Z is a member of the group consisting of hydrogen, methyl and 1-adamantyl.

No references cited.

RICHARD K. JACKSON, *Primary Examiner.*